US011648841B2

(12) United States Patent
Niederl

(10) Patent No.: US 11,648,841 B2
(45) Date of Patent: May 16, 2023

(54) CHARGING CABLE AND ADAPTER FOR ELECTRICALLY CHARGING AN ENERGY STORAGE DEVICE AT AN ENERGY SUPPLY DEVICE

(71) Applicant: Dietmar Niederl, Jagerberg (AT)

(72) Inventor: Dietmar Niederl, Jagerberg (AT)

( * ) Notice: Subject to any disclaimer, the term of this patent is extended or adjusted under 35 U.S.C. 154(b) by 61 days.

(21) Appl. No.: 16/646,281

(22) PCT Filed: Sep. 10, 2018

(86) PCT No.: PCT/EP2018/074342
§ 371 (c)(1),
(2) Date: Mar. 11, 2020

(87) PCT Pub. No.: WO2019/052963
PCT Pub. Date: Mar. 21, 2019

(65) Prior Publication Data
US 2020/0282849 A1    Sep. 10, 2020

(30) Foreign Application Priority Data

Sep. 12, 2017   (EP) .................................... 17190674

(51) Int. Cl.
*B60L 53/16*    (2019.01)
*B60L 53/30*    (2019.01)
(Continued)

(52) U.S. Cl.
CPC ............... *B60L 53/16* (2019.02); *B60L 53/18* (2019.02); *B60L 53/305* (2019.02);
(Continued)

(58) Field of Classification Search
CPC ........ B60L 53/16; B60L 53/18; B60L 53/305; H01R 31/065; B60Y 2200/91; B60Y 2400/30
(Continued)

(56) References Cited

U.S. PATENT DOCUMENTS

| 2013/0314034 A1* | 11/2013 | Ang | ........................ | B60L 53/16 |
| | | | | 320/107 |
| 2015/0023438 A1* | 1/2015 | Takata | ................... | H04B 3/548 |
| | | | | 375/257 |

(Continued)

FOREIGN PATENT DOCUMENTS

| CN | 101989718 A | 3/2011 |
| DE | 10 2011 007 763 | 10/2012 |

(Continued)

OTHER PUBLICATIONS

Europe Search Report conducted in counterpart European Appln. No. 17 19 0674 ( dated Feb. 20, 2018).

(Continued)

*Primary Examiner* — Nathaniel R Pelton
(74) *Attorney, Agent, or Firm* — Greenblum & Bernstein, P.L.C.

(57) ABSTRACT

A charging cable including a charging line detachably electrically connected at one end using a connection apparatus to an energy storage device to be charged and electrically connected at the other end to an adapter interface detachably connected in a form fit to an adapter. The adapter is detachably electrically connected to an energy supply device in order to transmit, via the charging cable, electrical energy from the energy supply device to the energy storage device to be charged. To obtain a particularly compact and robust charging cable, the adapter interface includes a communication device enabling a wireless communication with the adapter when the adapter is connected to the adapter interface, so that control signals between the energy supply device and an electronics system of the charging cable and/or of an energy storage device connected to the charging cable can be transmitted wirelessly between the adapter and the adapter interface.

12 Claims, 3 Drawing Sheets

(51) Int. Cl.
  *B60L 53/18* (2019.01)
  *H01R 31/06* (2006.01)
(52) U.S. Cl.
  CPC ........ *H01R 31/065* (2013.01); *B60Y 2200/91* (2013.01); *B60Y 2400/30* (2013.01)
(58) Field of Classification Search
  USPC ........................................................ 320/109
  See application file for complete search history.

(56) References Cited

U.S. PATENT DOCUMENTS

| | | | |
|---|---|---|---|
| 2017/0001529 A1 | 1/2017 | Fuchs et al. | |
| 2017/0062986 A1 | 3/2017 | Sasaki | |
| 2017/0062993 A1* | 3/2017 | Sumner | H01R 13/6691 |
| 2017/0334300 A1* | 11/2017 | Huang | H02J 7/00309 |
| 2018/0072169 A1* | 3/2018 | Lee | B60L 53/305 |

FOREIGN PATENT DOCUMENTS

| | | |
|---|---|---|
| DE | 10 2013 212 219 | 12/2014 |
| JP | 2014-203516 A | 10/2014 |
| JP | 2017-050179 A | 3/2017 |
| KR | 10-2017-0094869 | 8/2007 |
| WO | 2010/034741 | 4/2010 |
| WO | 2014/005567 A2 | 1/2014 |

OTHER PUBLICATIONS

Int'l Search Report (form PCT/ISA/210) conducted in Int'l Appln. No. PCT/EP2018/074342 (dated Dec. 6, 2018).

Int'l Written Opinion (form PCT/ISA/237) conducted in Int'l Appln. No. PCT/EP2018/074342 (dated Dec. 6, 2018).

Office action of the Japan Patent and Trademark Office, dated Jun. 7, 2022, for Japanese Patent Application No. 2020-513617, along with an English language machine translation.

Office action for Chinese patent application No. 201880072544.5 (which is a counterpart application, from the National Intellectual Property Administration, PLC, dated Nov. 28, 2022, in the English language.

Office action for Korean patent application No. 10-2020-7010068 (which is a counterpart application, from the Korean Intellectual Property Office, dated Sep. 28, 2022, along with an English language translation.

* cited by examiner

CHARGING CABLE AND ADAPTER FOR ELECTRICALLY CHARGING AN ENERGY STORAGE DEVICE AT AN ENERGY SUPPLY DEVICE

CROSS-REFERENCE TO RELATED APPLICATIONS

The present application is a U.S. National Stage of International Application No. PCT/EP2018/074342 filed Sep. 10, 2018 that claims priority under 35 U.S.C. §§ 119 and 365 of Europe Application No. EP 171 90 674.6 filed Sep. 12, 2017, the disclosures of which are expressly incorporated by reference herein in their entireties.

BACKGROUND

1. Field of the Invention

The invention relates to a charging cable, in particular for electrically charging an electric vehicle, comprising a charging line which can be detachably electrically connected at one end using a connection apparatus to an energy storage device to be charged and is electrically connected at the other end to an adapter interface which can be detachably connected in a form fit to an adapter, wherein the adapter can be detachably electrically connected to an energy supply device in order to transmit, via the charging cable, electrical energy or a charging current from the energy supply device to the energy storage device to be charged.

The invention furthermore relates to an adapter for a charging cable, which adapter can be detachably connected in a form fit at one end to an adapter interface of the charging cable and can be detachably electrically connected at the other end to an energy supply device in order to transmit, via the adapter, electrical energy or a charging current from the energy supply device to the charging cable.

The invention also relates to a method for electrically charging an energy storage device, in particular an energy storage device of an electric vehicle, at an energy supply device using a charging device comprising a charging line which is detachably electrically connected at one end using a connection apparatus to the energy storage device to be charged and is detachably electrically connected at the other end to the energy supply device via an adapter which is detachably connected in a form fit to an adapter interface.

2. Description of the Background

In order to be able to electrically charge electric vehicles in a flexible manner at different energy supply devices, charging devices composed of a charging cable and an adapter detachably connected to the charging cable are used. For this purpose, the charging cable is typically embodied such that the charging line thereof can be electrically connected at one end to the electric vehicle and at the other end comprises an adapter interface which can be detachably connected to adapters designed for different energy supply devices. Adapters can, for example, be designed for plugging into different country-specific domestic power outlets or three-phase power outlets. This offers the advantage that only one charging cable needs to be taken along, which cable can be flexibly adapted to an available charging infrastructure by a detachable connection to a matching adapter.

While this is a practicable solution for customary domestic charging infrastructures, many electric vehicle charging stations, in addition to the mere transmission of electric current via the charging device, also require a communication between the charging station and the electric vehicle, for example in order to adapt a charging power that is to be transmitted. For this purpose, it is necessary that control signal lines be integrated into a charging device or a charging cable in order to also transmit control signals between the charging station and the electric vehicle in addition to a charging current. The number of electrical contacts in the adapter interface and the adapters also increases accordingly. This leads to an enlargement of the adapter interface or the adapters, whereby a stowing size of the charging device is increased and a handling is impeded.

In addition, bulky adapters or adapter interfaces exhibit a higher susceptibility to external mechanical stresses. A charging device is typically exposed to varying weather conditions; moisture in particular constitutes a significant problem for electrical contacts. As a result of the additional electrical contacts for the control signal conductors, a surface area vulnerable to stresses caused by weather, in particular corrosion, is increased and a reliability of a communication carried out by means of the control signals is impaired.

SUMMARY

This is addressed by the invention. The object of the invention is to specify a charging cable of the type named at the outset which exhibits a high degree of robustness and practicability and is also suitable for enabling a dependable communication between an energy supply device and an energy storage device to be charged.

A further object is to specify an adapter of the type named at the outset for a charging cable, which adapter exhibits a high degree of robustness and practicability and is also suitable for enabling a dependable communication between an energy supply device and an energy storage device to be charged.

In addition, a method of the type named at the outset for electrically charging an energy storage device at an energy supply device using a charging device is to be specified, which method enables both a practicable electrical charging and also a dependable communication between the energy supply device and the energy storage device.

According to the invention, the first object is attained with a charging cable of the type named at the outset in which the adapter interface comprises a communication device that enables a wireless communication with the adapter comprising a corresponding communication device when the adapter is connected to the adapter interface, so that control signals between the energy supply device at one and at the other end an electronics system of the charging cable and/or of an energy storage device connected to the charging cable can be transmitted wirelessly between the adapter and the adapter interface.

Since control signals can be transmitted wirelessly between the adapter interface and the adapter, electrical contacts for transmitting the control signals between the adapter interface and the adapter that can be detachably connected to the adapter interface can be omitted. Typically, the control signals are thus transported to the adapter via electrical contacts such as copper wires and converted into radio signals or the like in the adapter, which signals are again converted into electrical signals in the adapter interface and can be transmitted via copper wires. In this manner, the adapter interface can be embodied to be robust and compact, whereby a stability of the adapter interface against external mechanical stresses is increased and a stowing size of the charging cable is also reduced. A high practicability is thus ensured during transport, and handling during a use of the charging cable is rendered easier. In addition, a small number of electrical contacts results in high resistance to stresses caused by weather, since for example a surface area vulnerable to corrosion is reduced. Since the control signals are not transmitted between the adapter and the adapter interface via electrical contacts, a control signal transmission between the adapter and adapter interface is achieved which is independent of environmental influences and low-interference, whereby a stable and dependable communication between the energy supply device and the energy storage device to be charged is ensured.

A wireless transmission of control signals between the adapter interface and the adapter also yields the advantage that adapters which are intended to enable a connection of the charging cable to an energy supply device that does not require a transmission of control signals, such as adapters for domestic power outlets, can still be embodied in a compact and space-saving manner. Otherwise, in terms of their size, adapters of this type would have to be needlessly adapted in accordance with an adapter interface enlarged by additional electrical contacts.

It has proven effective to embody the adapter interface or the adapter such that a form-fitting detachable connection can be produced, in particular by a plug connection, between the adapter interface and adapter. It is thus ensured that a stable mechanical and electrical connection can be produced between the electrical contacts of the adapter interface and of the adapter. If the connection is embodied as a plug connection, a simple and quick connection of the adapter and adapter interface is enabled and an adapter can be quickly replaced by another adapter. A particularly resilient connection can be obtained in that the adapter interface and the adapter can be detachably connected by a friction-fit or force-fit connection.

Normally, a quick-release fastener, in particular a snap-action lock, is provided in order to prevent an undesired detaching of the adapter interface and adapter. The adapter and adapter interface can then be quickly and easily connected and detached by a user. Particularly suitable is a snap-action hook lock with which a detachable form-fitting connection is produced in that a hook element is elastically deformed and then engages in a form fit with an element to be connected. By being elastically deformed once more, the hook element can be released again. A connection of this type is easy and quick to release and reconnect. Furthermore, snap-action hook locks and hook elements can easily be formed or produced using a casting method, in particular using an injection molding method. A quickly detachable connection can also be achieved for example with a bayonet connector, a screw connection, a clamped connection, or a similarly expedient detachable form of connection.

It is advantageous if the charging cable comprises a control device in order to control and/or monitor the transmitted electrical energy or a transmitted charging current. It can thus be ensured that a transmitted electrical energy or a charging current is transmitted according to the capacity of the charging cable and/or of the energy supply device and/or of the energy storage device to be charged. The control device provides an electrical charging that has a maximum possible charging power, and therefore provides a time-optimized charging process, in particular when control signals transmitted via the charging cable are taken into account. The control device can thereby be embodied such that it communicates with an energy supply device and/or the energy storage device to be charged, in order to optimally adapt a transmission of electrical energy.

To enable an optimized electrical charging, it is beneficial if the control device adapts the charging current according to an applied electrical voltage and/or current frequency. The control device expediently monitors the charging process in order to adapt a transmitted electrical power or interrupt a charging process, for example using a ground fault interrupter and/or an overcurrent protection device, in the event of anomalies, for example changes in the current and/or voltage, in order to ensure the safety of the electrical charging. Advantageously, it can be provided that the control device comprises a user interface via which a user can enter specifications relating to the charging process, such as a maximum charging current, an available energy supply device, etc., in order to predefine a desired charging process.

Particularly where an electric vehicle is electrically charged at domestic or three-phase power outlets, it is expedient if the control device is embodied as what is referred to as an in-cable control box, in order to ensure a safe electrical charging through a control and/or monitoring of the transmitted charging current. The in-cable control box thereby performs the necessary safety functions that are otherwise handled by an electric vehicle charging station. For this purpose, a necessary communication with the electric vehicle can also be handled by the control device, whereby any energy supply device can be used to electrically charge an electric vehicle.

The control device can be embodied as part of the charging line, whereby a constructionally simple design is ensured and maintenance is rendered easier. It is expedient if the control device is integrated into the adapter interface, which facilitates a handling of the charging cable.

It is beneficial if the adapter interface comprises at least five electrical contacts which can be detachably connected to electrical contacts on the adapter. An adaptation to a plurality of energy supply devices is thus enabled, since electrical energy or a charging current can be transmitted in parallel via multiple lines with the charging cable depending on the energy supply device.

It is advantageous if the adapter interface comprises three phase conductor contacts, one neutral conductor contact and one protective ground contact which can be detachably electrically connected to the corresponding contacts on the adapter. The phase conductor contacts and the neutral conductor contact are provided in order to enable a transmission of a charging current, in particular of a three-phase alternating current; the protective ground contact is used for safety and ensures potential equalization with a ground potential. A safe electrical charging or a safe transmission of electrical energy with three-phase alternating current is thus enabled. Depending on the energy supply device present, both a single-phase and also a poly-phase electrical charging are possible, whereby the charging cable or the adapter is suitable for an electrical charging at all common standard power outlets.

According to the invention, the other object is attained with an adapter of the type named at the outset which comprises a communication device that enables a wireless communication with the adapter interface comprising a corresponding communication device when the adapter is connected to the adapter interface, so that control signals between the energy supply device at one end and at the other end an electronics system of the charging cable and/or of an energy storage device connected to the charging cable can be transmitted wirelessly between the adapter and the adapter interface.

Because of the wireless transmission of control signals between the adapter and the adapter interface, electrical contacts for transmitting the control signals can be omitted on a side of the adapter which faces the adapter interface. As a result, the adapter can be embodied to be compact and very robust with respect to mechanical stresses. In this manner, a handling during a use of the adapter is rendered easier on the one hand and the required space during a transport of the adapter is also reduced, which is a relevant criterion in particular where multiple adapters are taken along. Advantageously, no electrical control signal contacts are necessary on the side of the adapter which faces the adapter interface, whereby a resistance of the adapter to stresses caused by weather is also increased, since surface areas vulnerable to corrosion are reduced, for example. Because the control signals are not transmitted between the adapter and the adapter interface via electrical contacts, an interference-immune control signal transmission between the adapter and adapter interface is achieved, whereby a stable and dependable communication between the energy supply device and the energy storage device to be charged is ensured. For this purpose, the adapter expediently comprises on a side facing the energy supply device both electrical contacts for receiving a charging current to be transmitted and also at least one electrical contact for a transmission of control signals. It is beneficial if at least one of these control signal contacts is electrically connected to the communication device of the adapter, in order to wirelessly transmit between the adapter and the adapter interface the control signals transmitted via said control signal contact, whereby the advantages explained above are obtained.

It is beneficial if the adapter comprises at least live electrical contacts, which can be detachably electrically connected to electrical contacts on the adapter interface, and at least one additional electrical control signal conductor contact which is electrically connected to the communication device of the adapter in order to transmit control signals. In this manner, an adaptation to different energy supply devices or electrical contacts thereof is enabled, since electrical energy or a charging current can be transmitted in parallel via multiple lines depending on the energy supply device. To transmit control signals with the communication device of the adapter, at least two of the electrical contacts of the adapter are electrically connected to the communication device of the adapter, so that an electrical variable can be transmitted to the communication device. For this purpose, in addition to the control signal conductor contact, an electrical contact of the adapter which is embodied, for example, as a protective ground contact can be electrically connected to the communication device. It can also be expedient to provide two or more electrical control signal conductor contacts which are electrically connected to the communication device of the adapter, whereby a control signal transmission is electrically decoupled from the other electrical contacts of the adapter. Because control signals can be transmitted to the communication device of the adapter, a wireless communication by means of the communication device of the adapter is enabled. A signal can be formed by any desired electrical variable that is suitable for transmitting information, for example a voltage difference, a current, a frequency, an amplitude or a peak value, etc.

Advantageously, the adapter comprises three phase conductor contacts, one neutral conductor contact, one protective ground contact, and at least one control signal conductor contact, wherein the phase conductor contacts, the neutral conductor contact and the protective ground contact can be detachably electrically connected to corresponding contacts on the adapter interface, and the at least one control signal conductor contact of the adapter is electrically connected to the communication device of the adapter. An adapter embodied in such a manner is suitable for ensuring a safe transmission of three-phase alternating current and for enabling, for example, a connection of a charging cable to a three-phase power outlet or, particularly in the case of an electric vehicle, a connection to a charging station designed for electrically charging an electric vehicle, for example, which charging station typically also envisages a transmission via at least three phase conductors. At the same time, a safe and stable transmission of the control signals between the charging station and the electric vehicle connected to the charging station is ensured by the wireless communication or control signal transmission by means of the communication device of the adapter.

It is beneficial if the adapter is embodied as an IEC 62169 Type 2 plug. This connection apparatus is a standard means for electrically connecting electric vehicles to energy supply devices or charging stations and enables safe electrical charging via three phase conductors. Three phase conductor contacts, one neutral conductor contact, one protective ground contact, and two control signal conductor contacts are thereby provided. The two control signal conductor contacts are referred to as the proximity pilot contact and control pilot contact, and are provided for exchanging control signals between the charging station and the electric vehicle electrically connected to the charging station. It has proven effective that both control signal conductor contacts of the adapter, and optionally also the protective ground contact, are electrically connected to the communication device of the adapter, whereby all of the communication between the charging station and the connected energy storage device or electric vehicle is transmitted wirelessly between the adapter and the adapter interface, and a safe and robust communication is ensured. If a control device or what is referred to as an in-cable control box is provided in the charging cable that is detachably connected to the adapter during electrical charging, a communication between the energy supply device or charging station and the energy storage device to be charged or electric vehicle can take place via the control device, or can also take place solely between the energy supply device and the connected vehicle. The charging process is then monitored and/or controlled by the control device, in particular based on charging parameters specified by a user, for example a maximum charging power which has been preset on the control device.

Expediently, adapters are embodied in the form of the customary connection apparatuses, in particular as Combo/CCS plugs or CHAdeMO plugs in the case of electric vehicles, to enable an electrical charging of energy storage devices at a plurality of different energy supply devices. Additional adapters with a design adapted to standard power outlets, in particular in different country-specific variants, both in single-phase and also in poly-phase designs, enable a flexible electrical charging of the energy storage device at any given infrastructure.

It is advantageous if an electronics unit of the adapter can be supplied with energy using energy from at least one control signal conductor contact of the adapter, wherein in particular an energy from the control signal conductor contact is temporarily stored until a predefined amount of energy is obtained, in order to enable a communication between the energy supply unit and the electronics unit of the adapter, and to thereby initiate the transmission of a charging current. It is thus enabled that a basic functionality of the adapter is ensured without an additional supply of energy, solely by means of the transmitted control signals. To this end, energy from the control signal conductor contacts, for example, can be stored temporarily, for example using one or more capacitors, until a temporarily stored energy is sufficient to supply the electronics unit, for example to provide a desired basic functionality, in particular a communication between the energy supply unit and the electronics unit of the adapter.

Alternatively, an additional supply of this type would be conceivable, for example, with an energy storage device integrated into the adapter or into a charging cable connected to the adapter, or in that the energy necessary therefor is made available by the energy supply device or the energy storage device to be charged. Typically, an electronics system in the adapter or in the charging cable must first be supplied with electrical energy by a transmitted charging current. Because an electronics unit of the adapter is supplied with energy using electrical energy from at least one control signal conductor contact or using the energy from transmitted control signals, a communication between the energy supply device and the electronics unit of the adapter can occur, for example, without an additional energy source being needed to supply energy to the electronics unit of the adapter. This is advantageous in particular in cases where an energy supply device requires a communication before a transmission of a charging current. In such cases, the control signals transmitted from the energy supply device via the control signal conductor contacts can be used to provide the electronics unit of the adapter with energy, whereby said electronics unit is rendered capable of communicating with the energy supply device, and thus of initiating a transmission of the charging current. If a charging current is transmitted, a supply of energy to the entire electronics system of the adapter or of a charging cable attached to the adapter is possible through the transmitted charging current. It is particularly preferred if an electric circuit for drawing energy from at least one control signal conductor contact or from the transmitted control signals is thereby embodied such that a communication by means of the control signals transmitted via the at least one control signal conductor contact of the adapter and the supply of energy to the electronics unit of the adapter using energy from the at least one control signal conductor contact of the adapter can be carried out at the same time. A drawing of energy from a control signal thereby does not lead to a change in an information content of the control signal, for which reason a communication can be carried out such that it is unaffected by the drawing of energy.

Particularly when electrically charging an electric vehicle at a charging station, a communication between the charging station and the electric vehicle is often necessary before a transmission of the charging current, for example in order to determine a charging power to be transmitted. However, if it is provided that this communication takes place via a control device arranged in the charging cable or is controlled via a device of this type, a supply of energy to the control device must first be ensured, however, in order to enable the communication. Through the supply of energy to the electronics unit in the adapter from the control signals transmitted by the charging station, the electronics unit can initiate a release of charging current, for example in that the electronics unit acts as if a certain electric vehicle were connected to the charging station. The adapter thereby simulates an electric vehicle to the charging station, for example in that an inner resistance in the adapter is changed upon acquisition of predetermined signals. The electronics unit thus simulates to the charging station, using the energy acquired via the control signal conductor contact and possibly temporarily stored, that a certain electric vehicle is connected to the charging station, and thus causes the charging station to release a charging current.

It would be conceivable to also envisage a functionality of this type in adapters or charging cables which do not provide wireless transmission of control signals between the adapter and the adapter interface of the charging cable. Advantageously, an adapter or a charging cable of the type named at the outset could then be embodied such that an electronics unit in the adapter or in the charging cable can be supplied with energy using energy from at least one electrical control signal conductor contact of the adapter or the adapter interface. Even though a charging device of this type is disadvantageous compared to a charging device with wireless transmission of the control signals between the adapter and the adapter interface due to a transmission of control signals between the adapter and the adapter interface via mutually detachable electrical contacts of the adapter and the adapter interface, the usability thereof is increased by an embodiment of this type in accordance with the aforementioned advantages, in particular in cases where an energy supply device requires a communication before a transmission of a charging current.

A charging device for electrically charging an energy storage device at an energy supply device preferably comprises a charging cable according to the invention and an adapter according to the invention. As a result, a particularly robust and versatile charging cable is obtained which can be used in particular for electrically charging an electric vehicle. It is thereby provided that the adapter and the adapter interface of the charging cable can be detachably electrically connected so that control signals which are transmitted, via the charging device, between the energy supply device and an electronics system in the charging cable and/or in the energy storage device to be charged can be transmitted wirelessly between the adapter and the adapter interface. Typically, the control signals are transmitted wirelessly between the adapter and the adapter interface, and are transmitted by wire between the adapter interface and the energy storage device or an electronics system in the charging cable.

The ensuing advantages, that the charging device comprises a charging cable of this type and an adapter of this type, correspond to those advantages which are attributed to a charging cable and an adapter, respectively, embodied as described above. The wireless transmissibility of control signals between the adapter interface and the adapter enables a compact and robust embodiment of the adapter interface and of the adapter, whereby a correspondingly compact and robust charging device, with marked stability in regard to mechanical stresses, is ensured. Furthermore, in regard to the components thereof, the charging device is embodied with a practicable stowing size and facilitates a handling during a use of the charging device. Because of the small number of electrical contacts in the adapter interface and the correspondingly embodied adapter, the charging device exhibits high resistance to stresses caused by weather. Since the control signals are not transmitted between the adapter and the adapter interface via vulnerable electrical contacts, a stable and dependable communication between the energy supply device and the energy storage device to be charged is ensured.

It is beneficial if the communication devices in the adapter and in the adapter interface are embodied as an RFID system in order to transmit the control signals between the adapter and the adapter interface. Due to the small size of an RFID system, such a system can be integrated into the adapter or the adapter interface without significant effects on a compactness and/or on handling properties. A communication thereby takes place between a base unit, which generates a high-frequency electromagnetic alternating field, and an interacting unit, also referred to as an RFID tag, which interacts with said electromagnetic alternating field and responds thereto, which is then measured by the base unit. A transmission of signals in both directions is thus enabled. For this purpose, the communication device of the adapter interface is embodied as a base unit or as an interacting unit and, correspondingly, the communication device of the adapter as an interacting unit or as a base unit. To enable more complex data transmissions, it can be beneficial to embody each of the two communication devices as a base unit and interacting unit, whereby a communication can proceed from each of the two communication devices in that the base unit thereof generates the electromagnetic alternating field and the interacting unit of the other communication device responds thereto.

Advantageously, the interacting unit of the RFID system is composed of an antenna, an analog circuit for receiving and sending, and a microcontroller for processing and storing information. Control signals can thus be transmitted and processed, and information can also be stored. The electromagnetic radio-frequency field used is expediently embodied to have a frequency of less than 30 MHz, whereby a communication range is limited. It can also be advantageous if the RFID system provides an encrypted transmission of signals, whereby data-protection security is further increased.

It has proven effective that the control signals can be transmitted between the adapter and adapter interface by means of electromagnetic induction, in a frequency range of less than 30 MHz, in particular in a frequency range of 10 MHz to 15 MHz, particularly preferably at approximately 13.56 MHz. It is thus achieved that the communication is limited to a close range and what is referred to as a close-coupling is implemented, whereby a safety of the transmission is ensured since electromagnetic interference introduced in the surrounding environment is extremely limited. For this purpose, the transmission standard of what is referred to as near-field communication is advantageously used, whereby a communication of this type can easily be implemented. Because the communication devices of the adapter and adapter interface are embodied as a bidirectional NFC system, a secure communication or control signal transmission between the adapter and adapter interface is achieved. Alternatively, a close-field coupling of this type can also be achieved with the same advantages by a capacitive coupling of the communication devices.

It is advantageous if the adapter comprises an encoding that can be identified by the adapter interface when the adapter is plugged into the adapter interface, in order to control the transmitted energy or a charging current according to the encoding. In this manner, a transmitted electrical energy or a transmitted charging current can be regulated or adjusted in accordance with the adapter connected to the adapter interface. Different adapters are used depending on the energy supply device or the capacity of an energy supply device. Thus, it is possible to match a transmitted energy or a charging current or a charging power to the capacity of the energy supply device through an identification of the adapter by means of the encoding thereof. For this purpose, an adapter interface expediently comprises an identification device which identifies the encoding of an adapter detachably connected to the adapter interface. In a particularly practicable embodiment, an encoding is embodied as an antenna element which is identified by an identification device equipped with an induction loop in that the antenna element of the adapter is brought into resonance with the induction loop of the identification device, which can be identified by a change in an imprinted voltage amplitude and/or current amplitude. Expediently, an encoding of this type can be achieved with RFID tags that are read by a reading unit on the adapter interface. However, it is also conceivable to implement the encoding through mechanical, electrical or magnetic features which are identifiable by a corresponding identification device on the adapter interface, in order to regulate the transmitted electrical energy accordingly.

It is advantageous if a connecting and detaching of the adapter to and from the energy supply device, respectively, and/or a connecting and detaching of the adapter to and from the adapter interface, respectively, and/or a connecting and detaching of the charging cable to and from the energy storage device to be charged, respectively, can be identified by at least one sensor device in the charging cable and/or in the adapter. It is thus ensured that a charging process is not started until the charging device is properly connected. Accordingly, it is advantageously provided that a charging process is immediately interrupted when one of these connections is released again. An engagement identification which interrupts an energy transmission upon a mechanical detachment of the charging device from the energy supply device is thus achieved in a simple manner. In particular, electric arcs and/or voltage spikes at the contacts, which can occur when electrical contacts are disconnected while they are under voltage loads at the same time, are prevented by an engagement identification of this type.

For this purpose, it has proven effective that the adapter comprises a sensing element to which a force is applied, and/or which is moved, when the adapter is connected to the energy supply device, and that a sensor unit is arranged in the adapter interface in order to detect an application of force to and/or a movement and/or a position of the sensing element. It is thus easily ensured that the adapter is connected both to the energy supply device and also to the adapter interface before a charging process is started, and that a charging process is immediately interrupted when the sensor unit in the adapter interface detects a release of one of the connections.

It is preferable if the sensing element is embodied as a spring-loaded displacement element comprising a magnetic region which is displaced against an active spring force when the adapter is connected to the energy supply device, and if the sensor unit is arranged in the adapter interface and embodied as a magnetic sensor in order to detect a position or movement of the magnetic region of the displacement element. A monitoring for a proper connection of the charging device to the energy supply device is thus easily achieved, since the magnetic sensor can identify both a proper connection and also a release of one of the connections, whereby it is ensured that a charging current is only transmitted when the charging device is properly connected to the energy supply device.

Based on the same aforementioned principle, it is advantageous if the connection apparatus of the charging cable comprises a sensing element to which a force is applied, and/or which is moved, when the charging cable is connected to the energy storage device to be charged, and if a sensor device is arranged in the charging cable in order to detect an application of force to and/or a movement and/or a position of the sensing element of the connection apparatus. It is thus easily ensured that the charging cable is connected to the energy storage device to be charged before a charging process is started, and that a charging process is immediately interrupted when the sensor device in the charging cable detects a release of the connection between the charging cable and the energy storage device to be charged.

Advantageously, it is provided that the adapter and/or the charging cable comprise at least one temperature sensor in order to determine a temperature or a temperature change at the electrical contacts or electric lines. It can thus be ensured that the charging process is not accompanied by undesired temperature increases that can occur in particular during a continuous load with high charging current. In addition, a charging time can be optimized by controlling the transmitted charging power as a function of a measured temperature in that a charging takes place with a predetermined maximum temperature, for example the predetermined maximum temperature of the charging line.

A simple handling of the charging device is achieved in that the adapter and the adapter interface are detachably connected using a quick-release fastener, in particular a snap-action lock. As a result of the quick-release fastener, the adapter and adapter interface can be quickly and easily connected and detached by a user, for example in order to exchange one adapter for another adapter. Particularly suitable is a snap-action hook lock, with which a detachable form-fitting connection is produced in that a hook element is elastically deformed and then engages in a form fit with an element to be connected. By being elastically deformed once more, the hook element can be released again. A connection of this type is easy and quick to release and reconnect. Furthermore, snap-action hook locks and hook elements can easily be formed or produced in a simple manner using a casting method, in particular using an injection molding method.

It is advantageous if the charging cable and/or the adapter comprise at least one lamp element which indicates an operating state of the charging device. A user can thus easily identify which operating state the charging device is in. This can occur, for example, in that different operating states are represented by different colors of light and/or by time-dependent light intensities. This can be achieved by one lamp element or multiple lamp elements. Expediently, the at least one lamp element comprises an LED, since an LED can be integrated in the charging device in a space-saving manner and requires only minimal maintenance work. Preferably, the at least one lamp element is embodied such that it enables an emission of light along a perimeter of a region of the charging cable or of the adapter, so that the emission of light can be easily identified by a user. This can be easily achieved, for example, by multiple LEDs arranged along the perimeter and/or by the use of light-guiding elements which change a direction of a light or scatter a light.

A functionality of the charging cable or the charging device can also be enhanced in that the charging cable or the charging device comprises at least one wireless module in order to enable a communication with an external device. In this manner, it is for example possible that an operating state, control signals, user-identification data, informational data about an energy supply device connected to the charging cable or charging device and/or about a connected energy storage device to be charged are alternately or cumulatively transmitted to and received by an external device. For this purpose, the wireless module can be embodied, for example, as a WLAN module, LTE module or Bluetooth module in order to achieve a communication with an external device in a simple manner and with little effort. The Bluetooth Low Energy wireless communication standard in particular is suitable for a communication of this type, since said standard enables a communication with particularly low energy consumption. The external device can, for example, be a control device in the charging infrastructure or a mobile device of the user, whereby a charging process can be monitored and/or controlled in a practicable manner. Expediently, the external device is a mobile phone, which enables a communication with the charging device in simple manner, for example via a software program provided therefor on the mobile phone. The charging process can thus be monitored and/or controlled in a user-friendly and practicable manner using the external device.

Advantageously, at least one data memory is arranged in the adapter or the charging cable, in which data memory aforementioned data are stored, for example. Expediently, a memory element of this type is embodied such that it can be read and written to in the course of a communication with an energy supply device and/or an energy storage device to be charged and/or an external device.

To facilitate an interaction with a user, a display is advantageously provided on the charging cable or on the adapter. Information, for example about a charging process or a device connected to the charging cable or the adapter, can thus easily be shared with a user. Expediently, a means of input is also provided on the charging cable or on the adapter in order to provide an interaction with the user, for example via touch operation. It is particularly advantageous if the display is embodied a touchscreen, whereby an interaction with the user is achieved in a simple manner.

It has proven effective that the adapter and the adapter interface are connected to one another without an intermediate cable. The charging device is thus embodied to be particularly robust and easy to handle.

According to the invention, the other object is achieved in that, in a method of the type named at the outset, control signals that are transmitted, via the charging cable, between the energy supply device and an electronics system of the charging cable and/or of the energy storage device to be charged are transmitted wirelessly between the adapter and the adapter interface. As previously described above, through a wireless transmission of the control signals between the adapter and adapter interface it is achieved that no electrical control signal contacts are required between the adapter and adapter interface, whereby the adapter and adapter interface can be embodied to be particularly compact and to have a marked resistance to mechanical stresses and effects caused by weather. The reduced size of the charging device enables a practicable handling of the charging device when a connection to the energy supply device and the energy storage device to be charged is being produced. Additionally, with the wireless transmission of the control signals between the adapter and adapter interface, a control signal transmission between the adapter and adapter interface that is interference-immune to external influences is achieved, whereby a stable and dependable communication between the energy supply device and the energy storage device to be charged is ensured.

It is thereby advantageous if an electronics unit of the adapter is supplied with energy from at least one control signal conductor contact of the adapter, wherein in particular an energy from the control signal conductor contact is temporarily stored until a predefined amount of energy is obtained, whereupon said electronics unit causes the energy supply device to begin a charging process. This is particularly expedient during an electrical charging at an energy supply device which requires a communication before the start of the charging process. In such cases, the control signals transmitted from the energy supply device via the at least one control signal conductor contact can be used to provide the electronics unit of the adapter with energy, whereby said electronics unit is rendered capable of communicating with the energy supply device, and thus of initiating a transmission of the charging current. If a charging current is transmitted, a supply of energy to the entire electronics system of the adapter or of a charging cable connected to the adapter is enabled through the charging current that can be transmitted.

Particularly preferably, a drawing of energy from the at least one control signal conductor contact or from the transmitted control signals is performed such that a communication by means of the control signals transmitted via the at least one control signal conductor contact of the adapter and a supply of energy to the electronics unit of the adapter using energy from the at least one control signal conductor contact of the adapter can be carried out at the same time. A drawing of energy from a control signal thereby does not lead to a change in an information content of the control signal, for which reason a communication can be carried out such that it is unaffected by the drawing of energy.

If charging cables and adapters or charging devices corresponding thereto are provided for different electric power classes or for a transmission of different maximum charging currents, it is expedient if the adapter interfaces and/or adapters have at least one, in particular constructional, feature which prevents a connection of an adapter interface to an adapter which is designed for a different electrical charging power or a different maximum charging current. In this manner, an inadvertent connection of an adapter interface to an adapter not intended for that adapter interface is prevented. This can occur, for example, in that an adapter interface has divider elements and adapters in the same power class have divider receivers corresponding to said divider elements. Adapters which are designed for a different power class or a different maximum charging current do not comprise these divider receivers, for which reason the adapters cannot be connected to the adapter interface. Of course, according to this principle, it can also be provided that an adapter interface comprises divider receivers and the associated adapters comprise divider elements. An inadvertent connection of a charging cable to an adapter which is designed for a different electrical charging power or a different electrical charging current is thus easily prevented.

BRIEF DESCRIPTION OF THE DRAWING

Additional features, advantages and effects follow from the exemplary embodiments described below. The drawings which are thereby referenced show the following.

DETAILED DESCRIPTION

Figure 1:
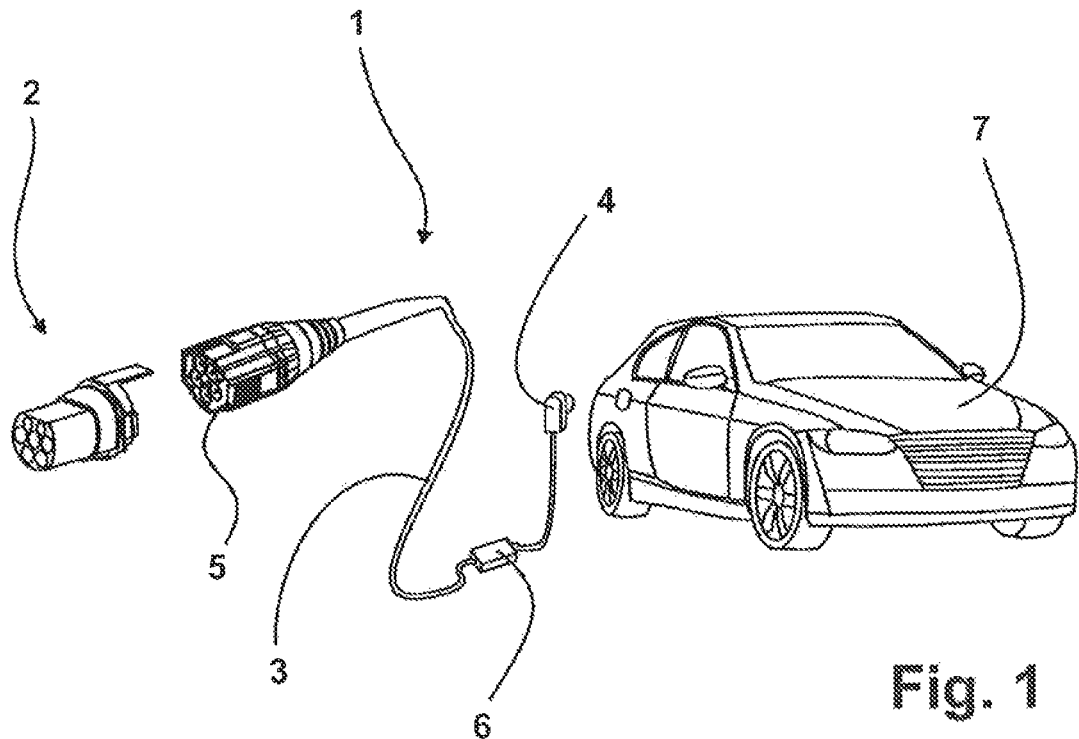
FIG. 1 A charging cable 1 according to the invention and an adapter according to the invention, for electrically charging an electric vehicle.

FIG. 1 shows a charging cable 1 according to the invention and an adapter 2 according to the invention, for electrically charging a stored electrical energy source of an electric car 7 in order to transmit electrical energy or a charging current from an energy supply device to the energy storage device of the electric car 7. The charging cable 1 comprises a charging line 3 which at one end can be detachably electrically connected to the electric car 7 or the energy storage device of the electric car 7 using a connection apparatus 4 and at the other end is electrically connected to an adapter interface 5 that can be detachably connected to the adapter 2. The adapter 2 can be detachably electrically connected at one end to the adapter interface 5 of the charging cable 1, and can be detachably electrically connected at the other end to the energy supply device, for example a power outlet. The adapter 2 thus constitutes an interchangeable intermediate piece, so that an adapter 2 adapted to the energy supply device can be connected to the adapter interface 5 depending on the available energy supply device. An electrical charging of the electric car 7 at different energy supply devices using just one charging cable 1 is thus rendered possible in that a matching adapter 2 is connected to the adapter interface 5 of the charging cable 1. In addition, a control device 6 is integrated into the charging line 3 of the charging cable 1, which control device 6 is embodied as what is referred to as an in-cable control box. The in-cable control box controls and/or monitors a transmitted electrical energy or a transmitted charging current in order to ensure that the transmitted electrical energy or the charging current is transmitted according to the capacity of the charging cable 1 and/or of the energy supply device and/or of the energy storage device of the electric car 7.

Both the adapter 2 and also the adapter interface 5 comprise communication devices so that control signals which are transmitted, via the charging cable 1 or the adapter 2, between the energy supply device at one end and an electronics system of the charging cable 1 and/or of the electric car 7 at the other end can be transmitted wirelessly between the adapter 2 and the adapter interface 5. Because the control signals are not transmitted between the adapter 2 and the adapter interface 5 via additional electrical contacts 8, the adapter 2 and the adapter interface 5 can be embodied to be robust and compact, which on the one hand facilitates a handling and transport of the same, and additionally enables an interference-immune communication or transmission of the control signals between the adapter 2 and the adapter interface 5. The communication devices of the adapter 2 and adapter interface 5 are embodied as an RFID system in order to wirelessly transmit the control signals based on a bidirectional near-field communication (NFC). Through the small size of the RFID system, said system can be integrated into the adapter 2 and the adapter interface 5 without significant effects on a compactness and/or durability.

Figure 2:
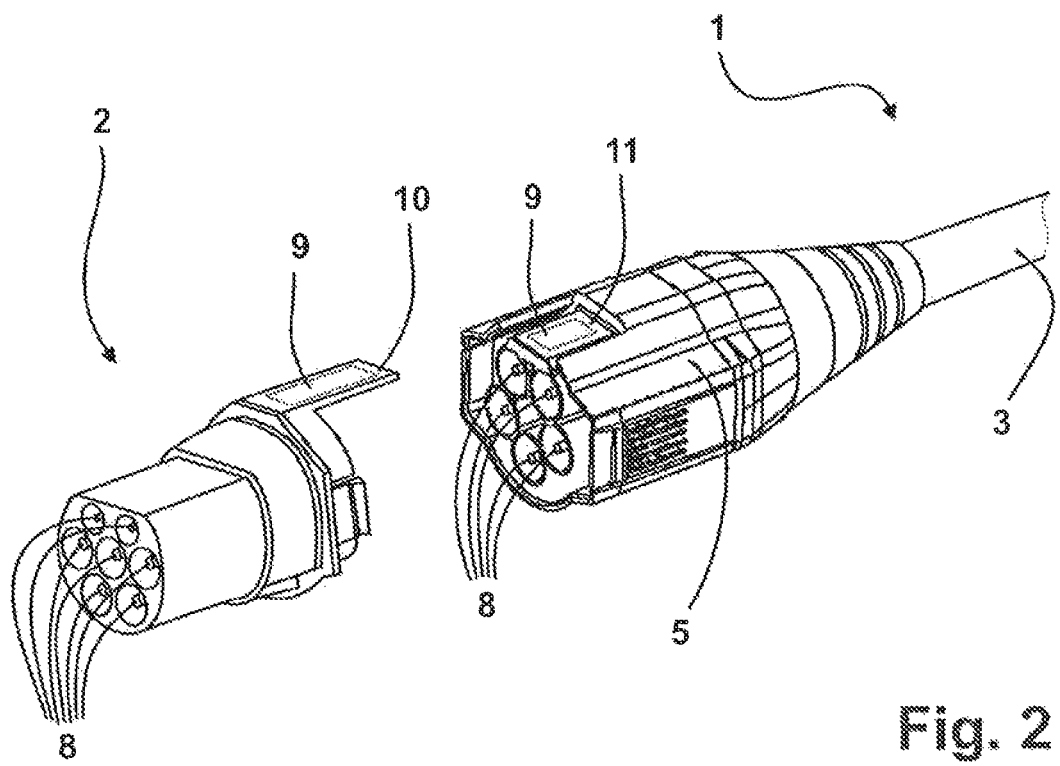
FIG. 2 An enlarged view of the adapter interface of the charging cable 1 and of the adapter from FIG. 1.

FIG. 2 shows an enlarged view of the adapter 2 illustrated in FIG. 1 and of the adapter interface 5 of the charging cable 1. The adapter 2 and adapter interface 5 are embodied such that they can be plugged into one another in a form and friction fit, whereby a durable mechanical connection between the adapter 2 and adapter interface 5, or between the electrical contacts 8 thereof, is ensured. The adapter interface 5 comprises five electrical contacts 8, wherein three electrical contacts 8 are embodied as phase conductor contacts, one electrical contact 8 is embodied as a neutral conductor contact, and one electrical contact 8 is embodied as a protective ground contact. The phase conductor contacts and the neutral conductor contact are provided in order to enable a transmission of a charging current, in particular a three-phase alternating current. The protective ground contact is used for safety and ensures potential equalization with a ground potential.

The five electrical contacts 8 of the adapter interface 5 can be detachably electrically connected to corresponding electrical contacts 8 on the adapter 2, thus enabling a safe electrical charging or a safe transmission of electrical energy via an energy supply device formed by the adapter 2 and charging cable 1.

On the side facing an energy supply device, the adapter 2 is embodied as an IEC 62169 Type 2 plug and comprises seven electrical contacts 8, wherein five electrical contacts 8 can be detachably electrically connected to the electrical contacts 8 of the adapter interface 5. The other two electrical contacts 8 are embodied as control signal conductor contacts and are used for a transmission of control signals or for communication between the energy supply device and an electronics system of the charging cable 1 and/or of the electric car 7. Within the scope of the communication between the energy supply device and the electric car 7, the two control signal conductor contacts are also referred to as a proximity pilot contact and control pilot contact.

The communication devices of the adapter 2 and the adapter interface 5 are embodied in the form of what are referred to as NFC printed circuit boards 9 which carry out the bidirectional near-field communication between the adapter 2 and adapter interface 5. For this purpose, the control signal conductor contacts and also the protective ground contact of the adapter 2 are electrically connected to the NFC printed circuit board 9 of the adapter 2 in order to transmit control signals between the energy supply device and the NFC printed circuit board 9 of the adapter 2.

Typically, the control signals are thereby produced or transmitted using voltage differences that are present between one of the control signal conductor contacts and the protective ground contact.

Since near-field communication is limited to a communication at a close range, the NFC printed circuit board 9 is arranged in the adapter 2 and the NFC printed circuit board 9 is arranged in the adapter interface 5 such that said printed circuit boards have a smallest possible distance from one another when the adapter 2 is plugged into the adapter interface 5. For this purpose, the adapter 2 comprises a guide element 10 which can be inserted into a corresponding guide element receiver 11 on the adapter interface 5, which guide element receiver 11 is embedded as a recess in the surface of the adapter interface 5, during a connection of the adapter 2 and adapter interface 5. Because the NFC printed circuit board 9 of the adapter 2 is integrated into the guide element 10 of the adapter 2 and the NFC printed circuit board 9 of the adapter interface 5 is integrated into the surface of the guide element receiver 11 of the adapter interface 5, a small distance between the NFC printed circuit boards 9 in the connected state, and therefore a secure communication, is achieved.

To enable charging at a charging station that requires a communication between the charging station and the electric car 7 before a transmission of the charging current, an electronics unit is arranged in the IEC 62169 Type 2 plug illustrated, which electronics unit can be supplied with energy using energy from at least one of the control signal conductor contacts of the adapter 2. A basic functionality of the adapter 2 is thus ensured without an additional supply of energy, solely by means of the transmitted control signals. In particular, a communication between the charging station and the electronics unit of the adapter 2 is thus enabled in order to initiate the transmission of the charging current. This communication is expediently achieved in that an electrical resistance in the adapter 2 is changed when predetermined control signals transmitted from the charging station to the adapter 2 are acquired.

Where an electric car 7 is connected to a charging station by means of an IEC 62169 Type 2 plug, this communication typically takes place in that the charging station applies predefined voltages between the control pilot contact and the protective ground contact and between the proximity pilot contact and the protective ground contact. Through the variation of electrical resistances, the electric car 7 can produce defined voltage dips in the applied voltages, and can thus communicate with the charging station and, for example, transmit a standby state or a maximum charging current.

Because the electronics unit of the adapter 2 produces these voltage dips in the signals of the control pilot contact and of the proximity pilot contact, it acts as if a certain electric vehicle were connected to the charging station, and a release of charging current is thus initiated. The adapter 2 or the electronics unit of the adapter 2 thus simulates to the charging station, using the energy acquired via at least one of the control signal conductor contacts, that a connected electric vehicle is connected to the charging station, whereby the charging station transmits the charging current.

Figure 3:
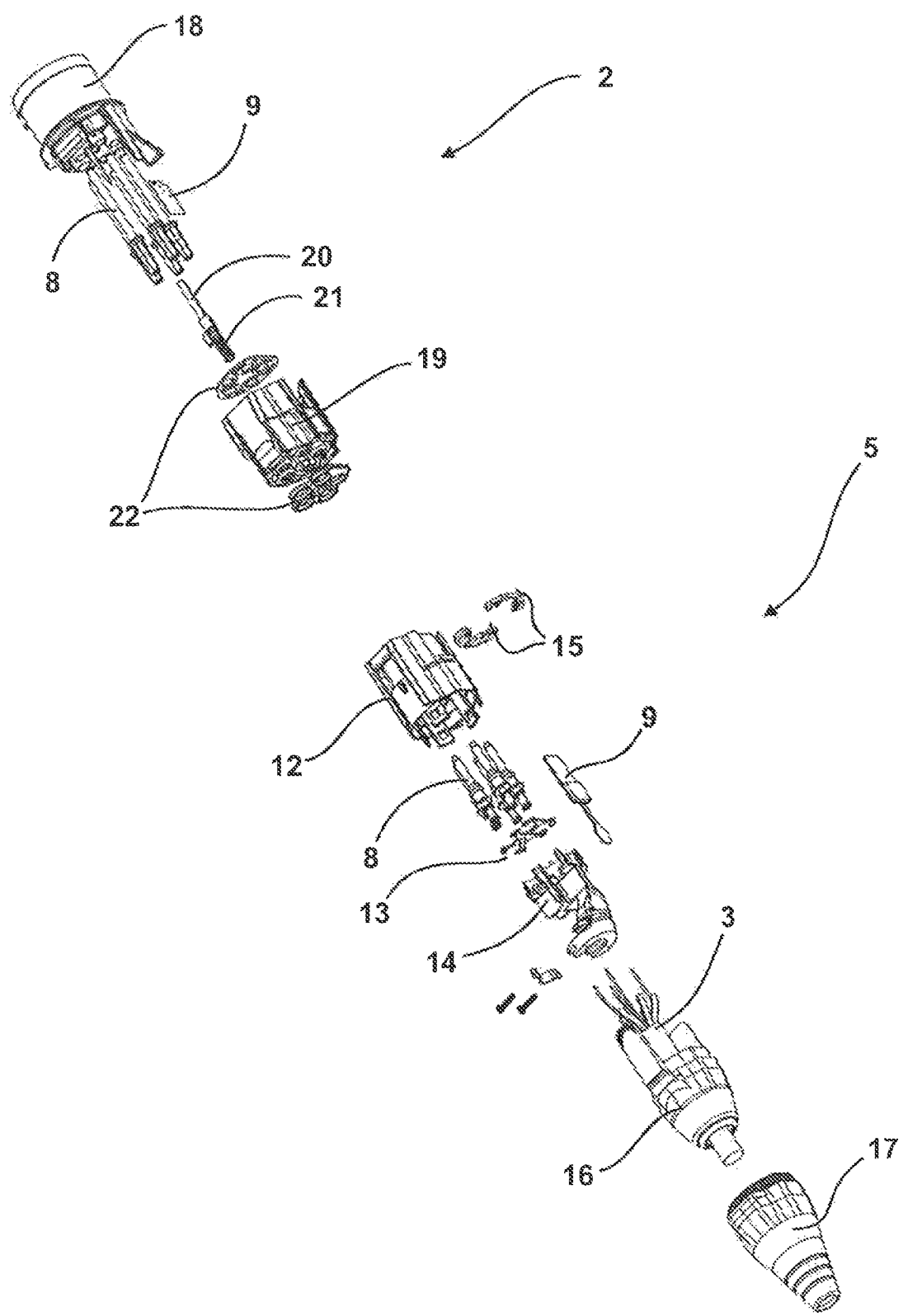
FIG. 3 An exploded view of an adapter according to the invention and an adapter interface according to the invention.

FIG. 3 shows an exploded view of the adapter interface 5 and of an adapter 2 according to the invention. The adapter interface 5 comprises an adapter interface housing 12, into which the electrical contacts 8 of the adapter interface 5 are inserted in the form of contact pins. By means of a cable holder 14, said contact pins are connected to electric wires of the charging line 3 via a strain relief using a bracket. Also visible is the NFC printed circuit board 9 of the adapter interface 5, which is embodied as a flat element and is integrated into the adapter interface housing 12 beneath the guide element receiver 11. Additionally illustrated are two light-guiding elements 15 which guide, in an outward direction, the light emitted by a lamp element arranged in the adapter interface housing 12. The lamp element thereby indicates an operating state of the charging cable 1 to the user. Also visible is an electronics element 13 arranged in the adapter interface 5, for example in order to perform a closed- and open-loop control of at least one or more lamp elements, temperature sensors, magnetic sensors arranged in the charging cable 1 or in the adapter 2, and/or other sensor devices arranged in the charging cable 1 and/or in the adapter. Furthermore, a cable housing inner piece 16 is illustrated which is connected to the adapter interface housing 12 by a cable housing outer piece 17, whereby the individual parts of the adapter interface 5 are surrounded by a robust housing.

The adapter 2 illustrated in FIG. 3 comprises at one end an adapter outer piece 18 which is embodied for connection to an energy supply device and at the other end an adapter inner piece 19 which is embodied for a connection to the adapter interface 5. Electrical contacts 8 in the form of contact pins are inserted into the adapter outer piece 18 and the adapter inner piece. Also visible is an NFC printed circuit board 9 integrated into the adapter 2 in order to achieve a wireless communication with the adapter interface 5. Additionally illustrated is a sensing element 20 in order to register a detachment of the adapter 2 from the energy supply device and a detachment of the adapter 2 from the adapter interface 5. For this purpose, the sensing element 20 comprises on the side thereof facing the adapter interface 5 a magnetic region, the position or movement of which can be detected by a magnetic sensor in the adapter interface 5.

The sensing element 20 is loaded by a spring 21 and, in the case of a connection of the adapter 2 to the energy supply device, is slid against an active spring force into a sensing element receiver arranged on the adapter inner piece 19 or is displaced within the sensing element receiver. If the adapter 2 is detached from the energy supply device or from the adapter interface 5, this results in an increase in the distance between the magnetic region of the sensing element 20 and the magnetic sensor of the adapter interface 5. This is detected by the magnetic sensor, whereby a release of the connection between an energy supply device and the adapter 2 and also a release of the connection between the adapter 2 and the adapter interface 5 can be identified, and a monitoring for a proper connection of the adapter 2 or of the charging cable 1 to the energy supply device is achieved. Also illustrated are two sealing elements 22 which are arranged for protection against moisture between the adapter outer piece 18 and adapter inner piece 19 and on an outer side of the adapter inner piece 19 facing the adapter interface 5.

Figure 4:
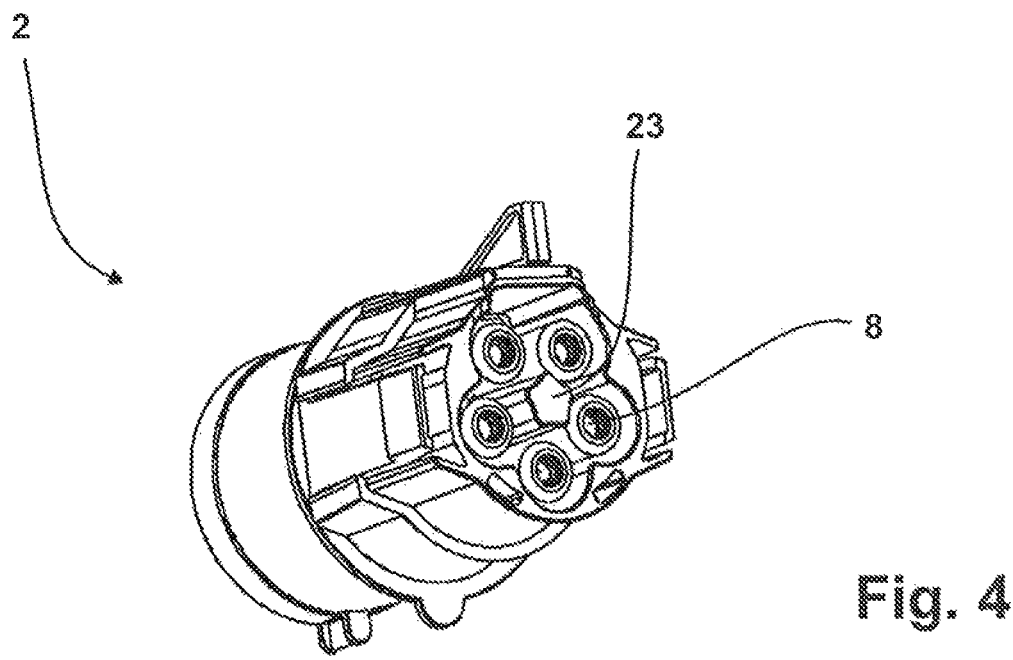
FIG. 4 An adapter according to the invention in a view which shows a side of an adapter facing the adapter interface.

FIG. 4 shows an adapter 2 according to the invention in a view which shows a side of the adapter 2 facing the adapter interface 5. Visible are five electrical contacts 8 that can be connected to corresponding electrical contacts 8 on the adapter interface 5 described above. Also visible is a rod-shaped element 23 which is arranged between the electrical contacts 8. This constitutes the outer surface of the sensing element receiver arranged in the adapter inner piece 19, into which receiver the spring-loaded sensing element 20 illustrated in FIG. 3 is slid in the case of a connection of the adapter 2 to an energy supply device, or within which receiver the sensing element 20 is displaced.

Figure 5:
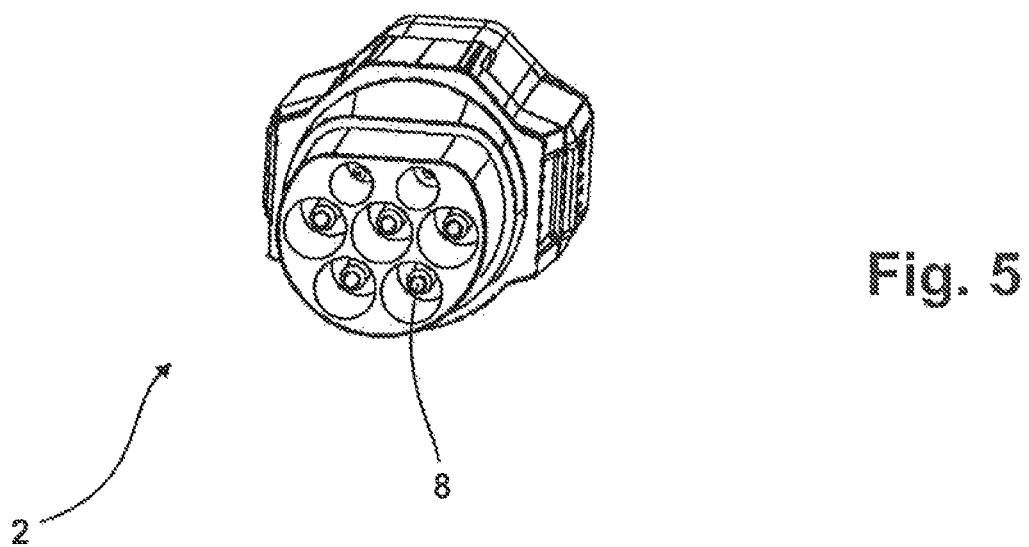
FIG. 5 An adapter according to the invention in a view which shows a side of an adapter facing an energy supply device.

FIG. 5 shows a further variant of an adapter 2 in a view facing the energy supply device. Visible are seven electrical contacts 8, wherein five electrical contacts 8 are provided for the electrical connection to an adapter interface 5 and two electrical contacts 8 are embodied as control signal conductor contacts. The two control signal conductor contacts are electrically connected to the communication device of the adapter 2 in order to wirelessly transmit control signals to the communication device of the interface 5.

A charging cable 1 according to the invention and an adapter 2 according to the invention and, accordingly, a charging device according to the invention, enable a practicable electrical charging of an electric car 7 at different energy supply devices in that an adapter 2 that matches the available energy supply device is plugged into the charging cable 1. Because control signals that are transmitted between the energy supply device and an electronics system of the charging cable 1 and/or of the electric car 7 via the charging cable 1 are transmitted wirelessly between the adapter 2 and the adapter interface 5 through bidirectional near-field communication, the adapter interface 5 and adapter 2 can be embodied to be compact and robust and, at the same time, a dependable and interference-immune communication by means of the control signals can be achieved. Through the transmission of the control signals using bidirectional near-field communication, a high security of the communication is ensured since this communication is restricted to a spatially limited region.

Thus, a practicable electrical charging of the electric car 7 is both possible at energy supply devices which require a communication by a transmission of control signals, and an electrical charging is also further ensured in a practicable manner at conventional single- or poly-phase standard power outlets.

The invention claimed is:

1. An adapter for a charging cable for charging an electric vehicle, said adapter comprising:
    a first end comprising a form fit configured to be connected to an adapter interface of a charging cable;
    a second end configured to be detachably electrically connectable to an energy supply device in order to transmit, via the adapter, electrical energy from the energy supply device to the charging cable;
    a communication device configured to enable a wireless communication with the adapter interface comprising a corresponding communication device when the adapter is connected to the adapter interface, so that control signals between the energy supply device at one end and, at another end, an electronics system of the charging cable or an energy storage device connected to the charging cable can be transmitted wirelessly between the adapter and the adapter interface; and
    on a side facing the energy supply device, the adapter comprises both electrical contacts for receiving a charging current to be transmitted and at least one electrical control signal contact for a transmission of control signals, the control signal contact being electrically connected to the communication device of the adapter in order to wirelessly transmit between the adapter and the adapter interface the control signals transmitted via said control signal contact.

2. The adapter according to claim 1, further comprising:
    at least five electrical contacts configured to be detachably electrically connected to electrical contacts on the adapter interface, and at least one additional electrical control signal conductor contact that is electrically connected to the communication device of the adapter in order to transmit control signals.

3. The adapter according to claim 1, further comprising:
    electronics configured to be supplied with energy using energy from at least one control signal conductor contact of the adapter;
    energy from the control signal conductor contact is temporarily storable until a predefined amount of energy is obtained, in order to enable a communication between the energy supply unit and the electronics of the adapter, and to thereby initiate transmission of a charging current.

4. A charging device for electrically charging an energy storage device at an energy supply device for electrically charging an electric vehicle, said charging device comprising:
    a charging cable and an adapter;
    the charging cable comprising:
        a charging line;
        a connector at one end of the charging line, the connector being configured to be detachably electrically connected to the energy storage device to be charged; and
        an adapter interface at another end of the charging line, the adapter interface being configured to he detachably connected in a form fit to the adapter, the adapter being detachably electrically connected to the energy supply device to transmit, via the charging cable, electrical energy from the energy supply device to the energy storage device to be charged; and
        the adapter interface comprising a communication device configured to enable a wireless communication with the adapter comprising a corresponding communication device when the adapter is connected to the adapter interface, so that control signals between the energy supply device at one end and at another end an electronics system of the charging cable or of an energy storage device connected to the charging cable can be transmitted wirelessly between the adapter and the adapter interface; and the adapter comprising;
- a first end comprising a form fit configured to be connected to the adapter interface of the charging cable;
- a second end configured to be detachably electrically connectable to an energy supply device in order to transmit, via the adapter, electrical energy from the energy supply device to the charging cable;
- a communication device configured to enable a wireless communication with the adapter interface comprising a corresponding communication device when the adapter is connected to the adapter interface, so that control signals between the energy supply device at one end and, at another end, an electronics system. of the charging cable or an energy storage device connected to the charging cable can be transmitted wirelessly between the adapter and the adapter interface; and
- on a side facing the energy supply device, the adapter comprises both electrical contacts for receiving a charging current to be transmitted and at least one electrical control signal contact for a transmission of control signals, the control signal contact being electrically connected to the communication device of the adapter in order to wirelessly transmit between the adapter and the adapter interface the control signals transmitted via said control signal contact.

5. The charging device according to claim 4, wherein:
the communication devices in the adapter and in the adapter interface are embodied as an RFID system in order to transmit the control signals between the adapter and the adapter interface.

6. The charging device according to claim 4, wherein:
the control signals can he transmitted between the adapter and adapter interface via electromagnetic induction, in a frequency range of 10 MHz to 15 MHz, preferably at approximately 13.56 MHz.

7. The charging device according to claim 4, wherein:
the adapter comprises an encoding configured to be identified by the adapter interface when the adapter is plugged into the adapter interface, in order to control the transmitted electrical energy based on the encoding.

8. The charging device according to claim 4, wherein:
a connecting and detaching of the adapter to and from the energy supply device, respectively, or a connecting and detaching of the adapter to and from the adapter interface, respectively, or a connecting and detaching of the charging cable to and. from the energy storage device to be charged, respectively, are identifiable by at least one sensor in the charging cable or in the adapter.

9. The charging device according to claim 4, wherein:
the adapter comprises a sensing element to which a force is applied, or which is moved, when the adapter is connected to the energy supply device; and
a sensor unit is arranged in the adapter or adapter interface in order to detect an application of force to or a movement or a position of the sensing element.

10. A method for electrically charging an energy storage device of an electric vehicle at an energy supply device using a charging device according to claim 4, said method comprising:
connecting; the connector of the charging cable to the energy storage device to be charged;
connecting the adapter interface of the charging cable to the adapter via a form fit;
connecting the adapter to the energy supply device; and
whereby control signals transmitted via the charging cable, between the energy supply device and an electronics system of the charging cable or of the energy storage device to be charged are transmitted wirelessly between the adapter and the adapter interface.

11. The method according to claim 10, further comprising:
supplying an electronics unit of the adapter with energy from at least one control signal conductor contact of the adapter, wherein energy from the control signal conductor contact is temporarily stored until a predefined amount of energy is obtained, and whereupon the electronics unit causes the energy supply device to begin a charging process.

12. The method according to claim 11, wherein:
a communication via the control signals transmitted via the at least one control signal conductor contact of the adapter and a supply of energy to the electronics unit of the adapter using energy from the at least one control signal conductor contact of the adapter are carried out simultaneously.

* * * * *